Figure 1:
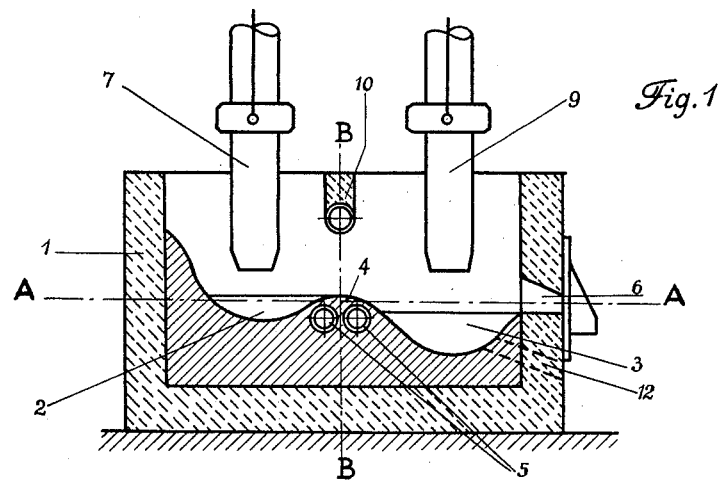

Oct. 24, 1939.  E. WINTER ET AL  2,177,622

ELECTRIC FURNACE FOR THE PRODUCTION OF CALCIUM CARBIDE

Original Filed Aug. 7, 1936

Inventors:
Ernst Winter,
Franz Lückerath,
Paul Windelband
(Hedi Windelband, Administratix)
By Potter, Pierce & Scheffler,
ATTORNEYS.

Patented Oct. 24, 1939

2,177,622

UNITED STATES PATENT OFFICE

2,177,622

ELECTRIC FURNACE FOR THE PRODUCTION OF CALCIUM CARBIDE

Ernst Winter, Cologne-Braunsfeld, Franz Lückerath, Hermulheim, Kreis Cologne-on-the-Rhine, and Paul Windelband, deceased, late of Knapsack, near Cologne-on-the-Rhine, Germany, by Hedi Windelband, administratrix, Wiesbaden, Germany, assignors to Aktiengesellschaft für Stickstoffdünger, Knapsack, near Cologne-on-the-Rhine, Germany Original application August 7, 1936, Serial No. 94,880. Divided and this application May 20, 1937, Serial No. 143,860. In Germany August 9, 1935

1 Claim. (Cl. 13—9)

The present invention relates to a process of preparing calcium carbide and an electric furnace for use therein.

In the preparation of calcium carbide a quantitative result has hitherto not been attained. A product containing about 80 per cent. calcium carbide has in general been regarded as satisfactory. As the rest of the product consists for the most part of lime, it is evident that the formation of calcium carbide has not been completed with the result that there is a considerable loss of raw materials and energy. The reason why the production of only a fraction of the theoretical yield is favored in the calcium carbide furnace is as follows:

Calcium carbide is prepared by fusing lime and coke, in a proportion stoichiometrically correct for the preparation of pure calcium carbide, in an electric arc-furnace or resistance furnace. It is evident that if the reaction between lime and coke is to be complete it is necessary for the carbon to react with the lime in all the phases of the process in such a manner that the transformation of the raw materials into calcium carbide is complete.

As soon as the starting material in the furnace has been heated to about 2200° C., the lime begins to soften and react with the carbon with evolution of carbon monoxide. The greater the quantity of calcium carbide formed and the higher the percentage of calcium carbide in the fused product the lower becomes the fusing point and viscosity of the mixture wherein the calcium carbide is formed; the minimum fusing point being about 1650° C. Thus as the reaction proceeds, the fluidity of the mixture capable of forming calcium carbide increases and the more fluid portion separates from the coke and flows to the bottom of the furnace. This separation is unfavorable to the further formation of calcium carbide, because the carbon becomes poor in lime, while the lime becomes concentrated at the bottom of the furnace. Even if the power of the furnace is now increased, calcium carbide can be formed only at a loss, because the percentage of lime in the carbon is low, and the mixture of calcium carbide at the bottom of the furnace is practically free from carbon and is low in calcium carbide. Furthermore owing to this fact the calcium carbide which has already been formed is partly decomposed again by overheating.

The conditions of the reaction can be improved and a calcium carbide of 85-95 per cent. strength obtained by dividing the process into at least two stages. This may advantageously be done by fusing the mass in a furnace which contains at least two separate hearths. The hearths may advantageously be at different levels. The mass of calcium carbide thus flows successively into the various hearths. The furnace may be subdivided by a partition which may be cooled so that two divisions are formed each possessing a smelting hearth.

Figure 2:
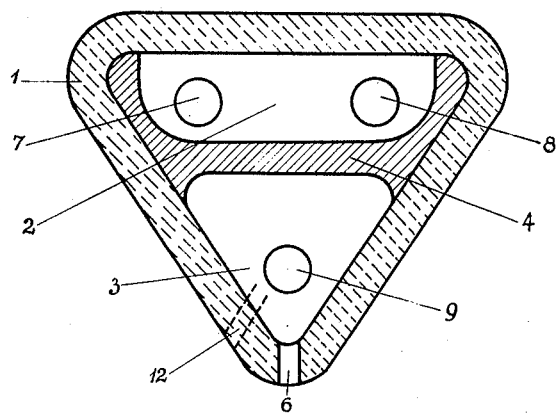
Figure 3:
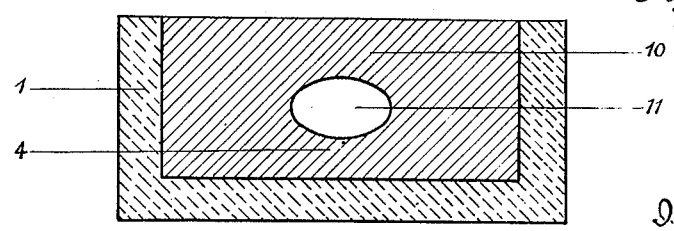

The accompanying drawing illustrates the invention diagrammatically:

Fig. 1 being a vertical cross section of a furnace,
Fig. 2 a horizontal cross section on the line A—A of Fig. 1 and
Fig. 3 a vertical cross section on the line B—B of Fig. 1.

The furnace comprises an exterior wall 1 and two hearths 2 and 3 separated by a sill 4 which may be cooled, for instance by tubes 5 through which the cooling liquid flows. The level of the hearth 3 is lower than that of the hearth 2. A tap hole 6 is situated next to the hearth 3. In the case of a three phase furnace two electrodes 7 and 8 are mounted above the hearth 2, and the third electrode 9 is mounted above the hearth 3. The position of the electrodes is indicated in Fig. 2. Above the sill 4 between the electrodes 7 and 8 on the one hand and the electrode 9 on the other hand is a separating wall 10 which may likewise contain a cooling tube. This wall serves to prevent the mixtures introduced above the hearths from mixing prematurely. The sill 4 and the separating wall 10 may be shaped as is diagrammatically illustrated in Fig. 3 wherein, for simplicity's sake, the cooling tubes have been omitted. In this case the sill 4 and the separating wall 10 are continuous so that the hearths 2 and 3 are only connected by the opening 11.

The hearth 2 is charged with a mixture of lime and carbon in such proportions that molten mixture containing about 60-70 per cent. of calcium carbide flows from the hearth 2 into the hearth 3 through the opening 11. The hearth 3 on the other hand is charged with a large excess of carbon. The calcium carbide of about 60-70 per cent. strength flowing into the hearth 3 where there is a high concentration of carbon, becomes carburized to such an extent that it is transformed into a calcium carbide of about 85-95 per cent. strength.

The furnace is preferably charged in such a manner that in the first hearth the eutectic mixture of calcium carbide and calcium oxide is produced; this mixture contains about 70 per cent. of calcium carbide and 30 per cent. of CaO. To obtain this mixture there is fed above the first hearth a mixture of about 100 parts by weight of CaO and about 45-52 parts of carbon calculated upon the pure materials. The eutectic mixture flows, as described above, into the second hearth where at least the quantity of carbon theoretically sufficient to transform the 30 per cent. of CaO contained in the eutectic mixture into calcium carbide is present. In order to balance any loss it is desirable to add a further quantity of carbon. The quantity of carbon for the second hearth amounts to about 16-23 parts for each 100 parts by weight of CaO introduced into the first hearth. If a large loss of carbon occurs owing to oxidation by air or other means, for instance the presence of iron oxide or the like, a further quantity of carbon must be added. If the lime contains iron oxide and perhaps also silicon dioxide there is attained with the aid of the furnace herein described a distinct separation of the iron and ferro silicon from the calcium carbide in the second hearth. The calcium carbide is the top layer and a separate tap hole 12 may therefore be provided at the bottom of the second hearth for the iron and ferro-silicon.

This application is a divisional application of United States patent application Serial No. 94,880 filed August 7, 1936.

We claim:

An electric furnace for producing calcium carbide comprising, a furnace; two inclined hearths in said furnace, one arranged at a higher elevation than the other; a sill extending across the furnace to separate the two hearths and to provide a wall common to each hearth; a partition located above and parallel to said sill but spaced therefrom to provide restricted communication between said hearths; means for cooling at least a portion of said partition; electrodes above said hearths for supplying heat thereto; an inlet for solid charge above the hearth of higher elevation, which inlet cooperates with said partition to confine solid charge to said hearth, the other hearth having an outlet for molten calcium carbide.

ERNST WINTER.
FRANZ LÜCKERATH.
HEDI WINDELBAND,
*Administratrix of Paul Windelband, Deceased.*